(12) United States Patent  (10) Patent No.: US 7,978,314 B2
Henschel  (45) Date of Patent: Jul. 12, 2011

(54) DISTANCE MEASURING DEVICE

(75) Inventor: Jürgen Henschel, Annweiler (DE)

(73) Assignee: Stabila Messgerate Gustav Ullrich GmbH, Annweiler (DE)

( * ) Notice: Subject to any disclaimer, the term of this patent is extended or adjusted under 35 U.S.C. 154(b) by 152 days.

(21) Appl. No.: 12/248,932

(22) Filed: Oct. 10, 2008

(65) Prior Publication Data

US 2009/0097011 A1  Apr. 16, 2009

(30) Foreign Application Priority Data

Oct. 11, 2007  (DE) .................. 20 2007 014 259 U

(51) Int. Cl.
*G01C 3/08*  (2006.01)
(52) U.S. Cl. ..................................... 356/4.01; 356/5.01
(58) Field of Classification Search .............. 356/4.01, 356/5.01, 5.15, 28
See application file for complete search history.

(56) References Cited

U.S. PATENT DOCUMENTS

| | | | | |
|---|---|---|---|---|
| 4,850,009 A * | 7/1989 | Zook et al. ............... | 379/93.17 |
| 5,287,627 A * | 2/1994 | Rando ...................... | 33/227 |
| 5,925,872 A * | 7/1999 | Wyatt et al. .............. | 235/472.01 |
| 7,013,570 B2 * | 3/2006 | Levine et al. ............. | 33/286 |
| 7,278,218 B2 * | 10/2007 | Levine ..................... | 33/286 |
| 7,392,592 B2 * | 7/2008 | Bublitz et al. ........... | 33/290 |
| 7,562,824 B2 * | 7/2009 | Bhatia et al. ............ | 235/462.01 |
| 2006/0225296 A1 * | 10/2006 | Schulte ................... | 33/501.06 |

FOREIGN PATENT DOCUMENTS

| DE | 10063483 | 7/2001 |
|---|---|---|
| WO | 0175396 | 10/2001 |
| WO | 2005038406 | 4/2005 |

* cited by examiner

*Primary Examiner* — Isam Alsomiri
(74) *Attorney, Agent, or Firm* — Dennison, Schultz & MacDonald

(57) ABSTRACT

A distance measuring device including a housing that contains a radiation emitting and receiving device, a switch for emitting the radiation and a control panel, where a first wall of the housing features an opening for radiation emission and reception, and the opposite wall or its outer surface forms a stop surface or a stop edge. In order to enable simple handling, it is proposed that a handle emerges from the housing which is displaceable in relation to the housing or can be reset and grasped laterally to the housing.

13 Claims, 4 Drawing Sheets

DISTANCE MEASURING DEVICE

BACKGROUND OF THE INVENTION

The invention relates to a distance measuring device, such as a laser distance measuring device, comprising a housing with a radiation emitter and a radiation receiver present inside it, an activator for emitting the radiation, and a control panel, whereby a first wall of the housing features a radiation outlet and inlet aperture, and an opposite wall, or as the case may be its outer surface, forms a stop surface, or as the case may be a stop edge.

Corresponding distance measuring devices are used for measuring distances. For this purpose, the boundary wall of the housing opposite the radiation outlet, or as the case may be inlet opening, normally serves as a housing support, in order to carry out a measurement.

Measurements are often carried out from wall to wall, when the user stands laterally to the device and holds the end of the device against the wall. Because of this positioning, the user is forced to operate the device in an ergonomically difficult position between the palm of the hand and the thumb.

A distance measuring device is known from WO-A-01/75396, with which there is the possibility to capture a desired pivoting angle between two or more distances to be measured. For this purpose, the housing is affixed to a stand. The housing can then be pivoted around an axis provided by the stand.

WO-A-2005/038406 discloses a distance measuring device that features a measuring stop body that can be adjusted in relation to the housing of the measuring device, in order to carry out different types of distance measuring.

A laser distance measuring device according to DE-A-100 63 483 provides for an adjustment rod that can be displaced along a longitudinal side of the housing, in order to enable exact alignment of the housing.

SUMMARY OF THE INVENTION

The present invention is based on the task of further developing a distance measuring device of the type cited at the beginning in such a way that simple handling is possible, in particular that the device is ergonomically simple and secure to handle.

In order to satisfy this task, the invention essentially provides for a handle to emanate from the housing, a handle that can be displaced or moved in relation to the housing and grasped from the side of the housing.

It is provided in particular, that the handle be connected to the housing so as to pivot. In so doing, the axis of rotation should pass vertically through the flat sides of a rectangular shaped housing.

Alternatively, there is the possibility that the handle can be detached from the housing and reattached in different positions on the housing.

The handle preferably displays a U shape with flat limbs that extend along the flat sides and a transverse limb that connects them and extends in a non-pivoting position of the handle along one of the walls. The handle should thereby extend in a non-pivoting, or as the case may be an un-reattached position with its transverse leg along the wall forming the stop surface, or as the case may be stop edge.

One advantageous embodiment provides for the wall forming the stop surface, or as the case may be, stop edge, to preferably feature rib-like projections whose free outer surfaces provide a plane that forms the stop surface, or as the case may be stop edge.

In addition, the transverse limb of the handle can feature notch like slots. The projections should pass through these notches, when the handle is in its basic position, in such a way that their free outer surfaces form the stop surface, or as the case may be stop edge.

With the inventive construction, the housing will not be appreciably enlarged by the handle. At the same time, it is possible to pivot or reinsert the handle to either side of the transverse lateral surface, namely in a clockwise or counter-clockwise direction.

The transverse limb should thereby display a U-shaped geometry, particularly parallel to the flat limbs, with sections running between the longitudinal edges of the flat limbs, which, in the basic position of the handle, extend along the transverse lateral surface of the housing. Furthermore, the sections should also engage with geometrically adapted recessed areas, namely as quasi notches in the housing. This results in an immovability that is then cancelled, when the handle is displaced in the longitudinal direction of the housing, so that pivoting is subsequently possible. At the same time, this provides the advantage of additional protection for the radiation outlet and inlet opening, without the latter being optically covered.

In a particularly advantageous embodiment, it is provided, that the actuator emanates from the handle, which additionally increases ease of operation. There is also the possibility of integrating the actual control panel into the handle. The actuator can also be an area of the control panel.

There is also the possibility of aligning the handle in such a way on the housing, that the radiation inlet, or as the case may be outlet opening is covered, in order to protect it.

BRIEF DESCRIPTION OF THE DRAWINGS

Additional details, advantages, and characteristics of the invention can be seen not only from the claims and the characteristics that can be inferred from them, individually and/or in combination, but also from the following description of the preferred embodiments that can be inferred from the drawing, in which:

DESCRIPTION OF THE PREFERRED EMBODIMENTS

Figure 1:
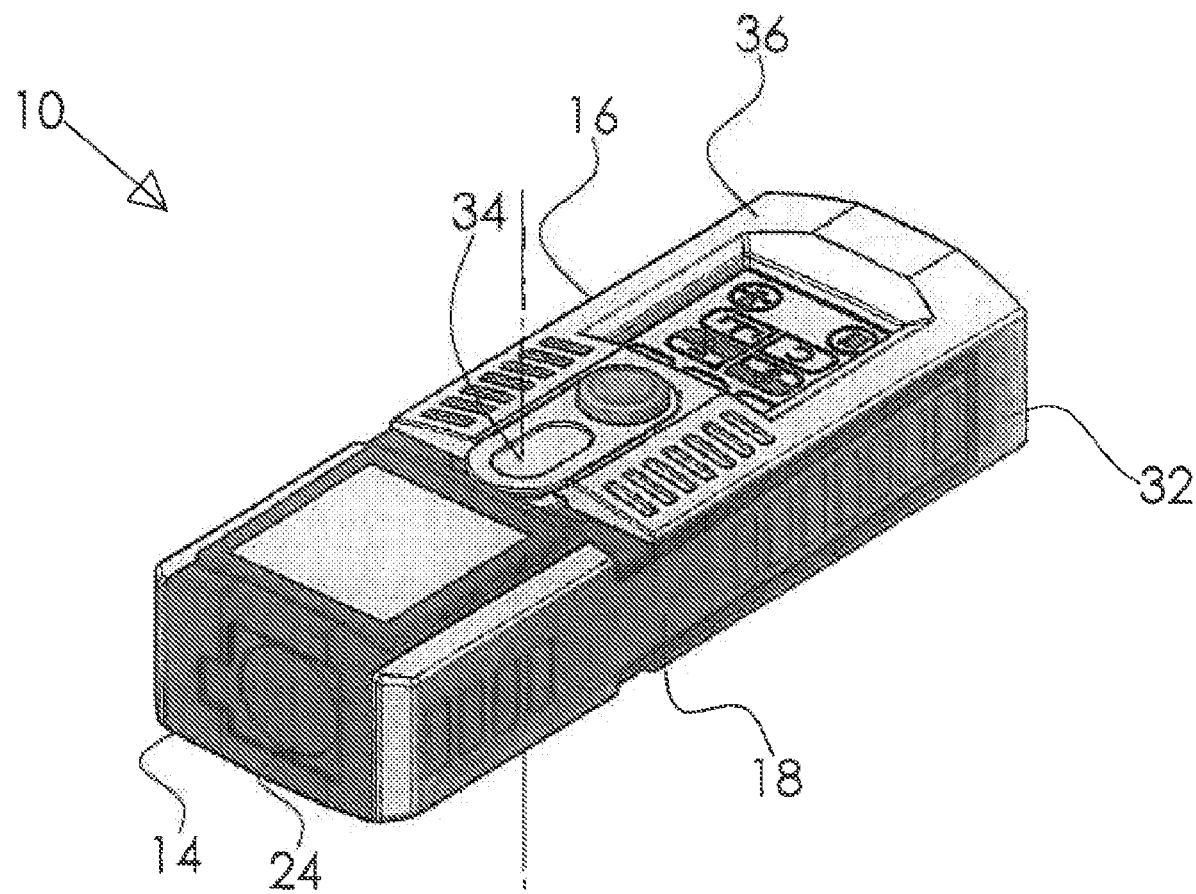
FIG. 1 is a distance measuring device in a first perspective drawing.

The figures are a representation, in purely principal terms, of a distance measuring device 10, particularly in the form of a distance measuring device that features a rectangular housing 12 with a first front surface 13 as stop surface or edge, an opposite front surface 14, transverse lateral surfaces 16, 18, and longitudinal lateral surfaces 20, 22. A laser beam outlet and inlet opening 24, through which the measuring beam is emitted and received after reflection, penetrates the front surface 14, or as the case may be the wall delimited by it on the outside. The opposite front surface 13 features, in this embodiment, rib-shaped projections 15, 17, 19, which intersperse a surface that forms the stop surface, or as the case may be the stop edge.

A control panel emanates from the upper lateral surface 20, in order to evaluate and numerically depict measuring signals by means of a processing unit present inside the housing. For this purpose, there is a display 30 on the front lateral surface 20, on which the measurement values are displayed.

Furthermore, there are a laser diode and optics in the housing, in order to concentrate to the desired extent the radiation emitted by the laser diode. In addition, there is a receiver, such as an optical-electronic converter, to receive the radiation. In this respect, however, reference is made to conventional constructions of distance measuring devices, which do not have to operate with laser radiation, but which can also operate with infrared radiation or ultrasound.

In contrast to known distance measuring devices, the inventive measuring device 10 features a handle 32, which is preferably both displaceable in the longitudinal direction of the housing 12 and can be pivoted around an axis passing through the lateral surfaces 20, 22. There is also the possibility of detaching the handle 32, i.e. from the measuring device 10, and reinserting it in a different position, for example, in a position that deviates by 90° from the longitudinal axis of the device housing 12.

In longitudinal section, the handle 32, which has a U shape, features two flat limbs 36, 38, which in their respective width extension, should correspond to the width of the flat sides 20, 22.

The transverse limb 40 that connects the flat limbs 36, 38, also has a U-shape in a plane running parallel to the flat limbs 36, 38 and therefore encompasses the longitudinal edges of the sections 42, 44 connecting the lateral limbs 36, 38, which engage corresponding notches 46, 48 in the walls forming the transverse sides 16, 18, in the basic position of the handle, as shown in FIG. 1.

In that way, the handle 32 in its basic position quasi-represents an integral component of the housing 12, without the latter being noticeably enlarged in terms of volume.

The transverse limb 40 also features strip-shaped openings 41, 43, 45, through which the rib-shaped projections pass, when the handle 32 is in its basic position, in such a way, that the outer surface of the transverse limb 40 either runs flush with the free outer surfaces of the projections 15, 17, 19 forming the stop surface, or as the case may be stop edge, or is recessed in relation to them.

Figure 2:
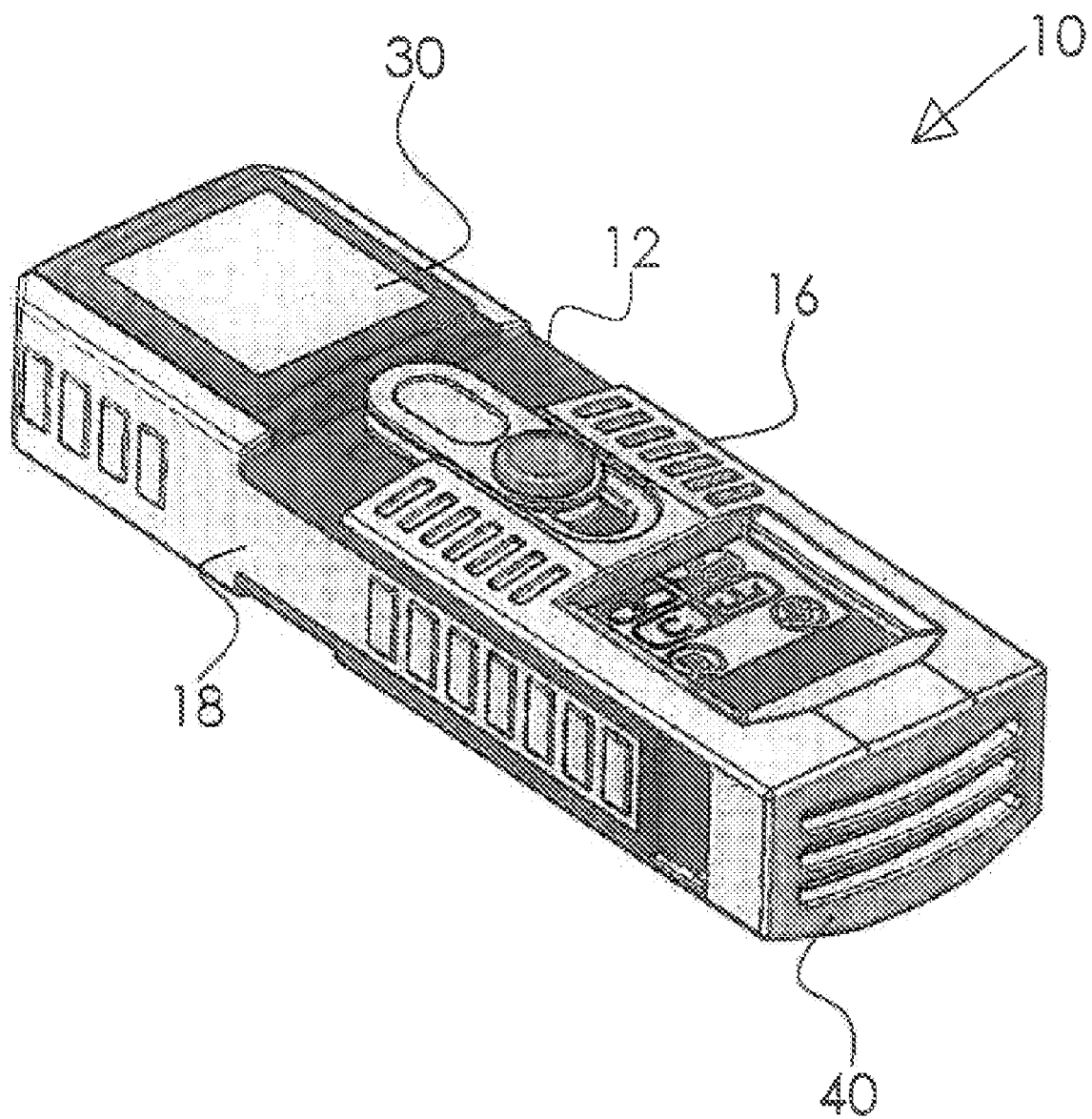
FIG. 2 is the distance measuring device according to FIG. 1 in a second perspective drawing.
Figure 3:
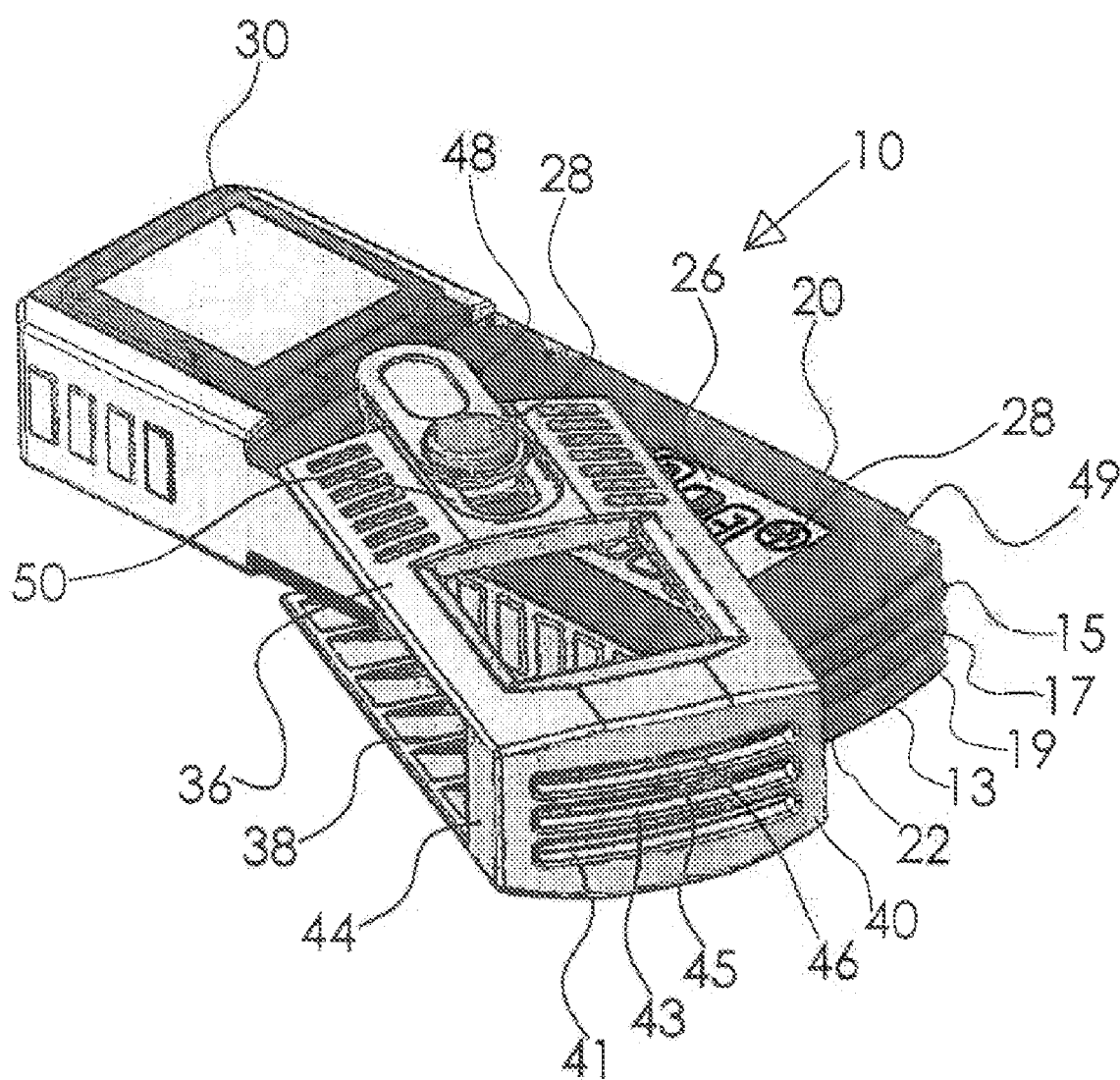
FIG. 3 is the distance measuring device according to the FIGS. 1 and 2 with a partially pivoted handle.
Figure 4:
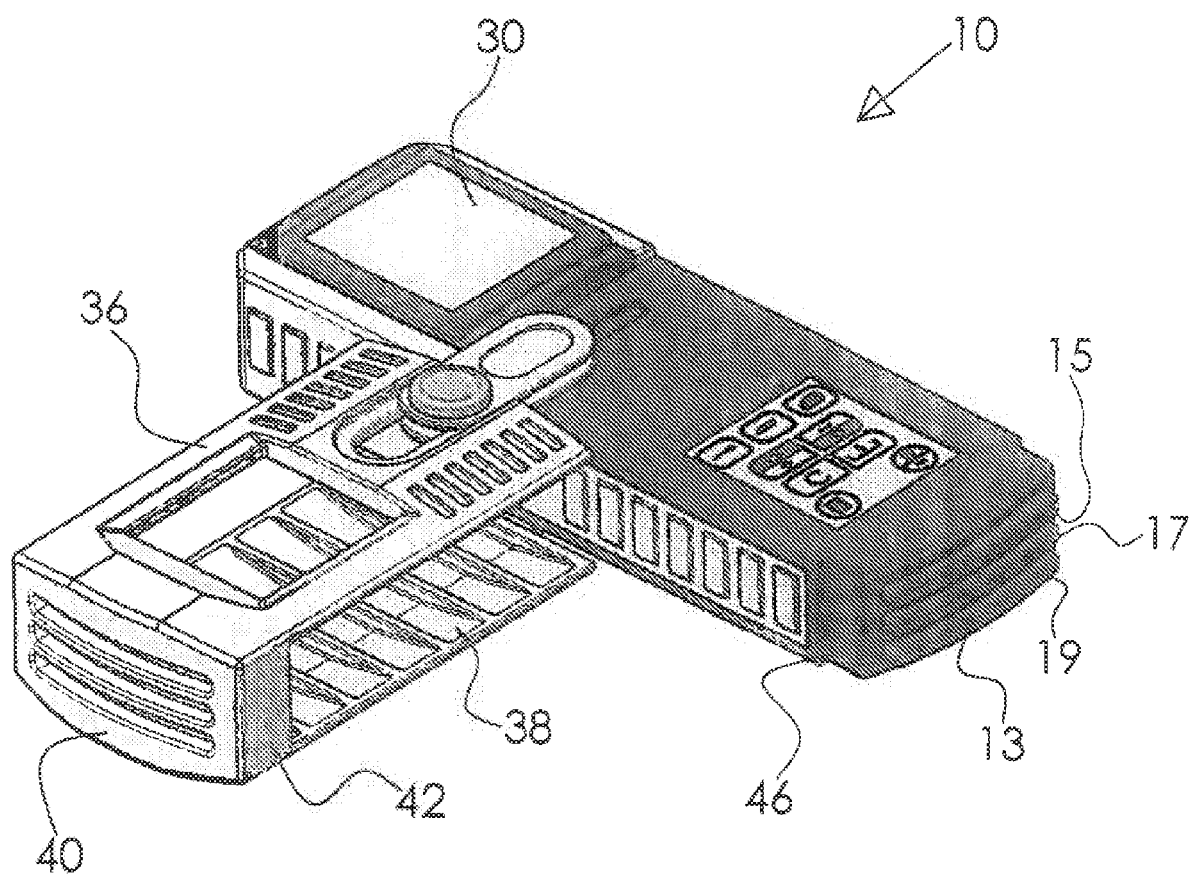
FIG. 4 is the distance measuring device according to the FIG. 1 to 3, with the handle pivoted by 90°.

In order to enable displacement and then pivoting of the handle 32 in the longitudinal direction of the housing, elongated flat brackets run along the longitudinal lateral surfaces 20, 22 of the housing 12, which are connected to each other and can be pivoted around the axis 34. The flat limbs 36, 38 then emerge from the brackets 48. For this purpose, the flat limbs 36, 38 feature recesses 50 adjusted to the brackets 48, whose inner edges engage correspondingly in longitudinal slots of the brackets 48. In this way, the brackets form a guideway for the handle 32 for its longitudinal displacement. In FIG. 1, the handle 32 is shown in its basic position, whereas in FIG. 2 the handle is axially displaced in such a way, that the sections 42, 44 engage with the notches, or as the case may be the recesses 46, 48 of the housing 12, and release the handle 32, so that it can be pivoted (FIGS. 3 and 4).

From the bracket 48 of the handle on the control-panel side, as shown in the figures, a pushbutton switch 28 also emerges, or some other switch for turning the device 10 on and off, or as the case may be for initiating measurement, so that it is pivoted along with the handle. The switch 28 can of course also emerge from the housing surface, or as the case may be, be integrated into the control panel 26.

Furthermore, the drawing also shows that the flat limb 36 that runs along the front side 20 of the handle 32 features a recess for the control panel.

What is claimed is:

1. A distance measuring device, comprising:
   a flat rectangular housing containing a radiation emitting and receiving device, a first outer wall, an opposite outer wall, a pair of outer side walls, a first outer end wall comprising a radiation inlet and outlet opening and a second outer end wall opposite the first end wall, the second end wall or outer surface thereof forming a stop surface or stop edge,
   an actuator for emitting the radiation,
   a control panel emerging from the first outer wall, and
   a handle originating from the housing, movable relative to the housing, accessible laterally from the housing, and pivotable around an axis passing through the first and opposite outer walls,
   said handle having a U-shape in cross-section, and comprising a first flat limb, a second flat limb and a connecting limb connecting the first and second limbs,
   the handle being pivotable from a central position in which the first limb extends along and covers a portion of the first outer wall of the housing, the second limb extends along and covers a portion of the opposite outer wall of the housing and the connecting limb extends along a portion of the second end wall of the housing,
   said handle also being laterally displaceable with respect to the housing.

2. A distance measuring device according to claim 1, wherein the handle is detachable from the housing and reinsertable in a different position on the housing.

3. A distance measuring device according to claim 1, wherein the handle has a U-shape with flat limbs that extend along the flat sides of the housing, and a transverse limb that connects the limbs, and which extends along one of the walls, in a non-pivoting position of the handle.

4. A distance measuring device according to claim 3, wherein the flat limb has a width extension equal or approximately equal to width of the flat side of the housing.

5. A distance measuring device according to claim 3, wherein the transverse limb parallel to the flat limbs has a U-shape, with sections running between the longitudinal edges of the flat limb, which in a basic position of the handle extend along the transverse sides of the housing.

6. A distance measuring device according to claim 5, wherein the sections engage with geometrically adjusted areas of the housing.

7. A distance measuring device according to claim 1, wherein the handle extends along the wall that forms the stop surface or the stop edge, in a non-pivoting position, or when the handle has not been reinserted into a different position.

8. A distance measuring device according to claim 1, wherein the wall forming the stop surface or the stop edge, features rib-like projections, having free external surfaces spanning a plane forming the stop surface or stop edge.

9. A distance measuring device according to claim 8, wherein the handle has a transverse limb with notches that match the projections.

10. A distance measuring device according to claim 9, wherein the projections, when the handle is in a basic position, pass through the notches such that free outer surfaces of the projections form a stop surface or stop edge.

11. A distance measuring device according to claim 1, wherein a switch emerges from the handle.

12. A distance measuring device according to claim 11, wherein the switch is a push button switch.

13. A distance measuring device according to claim 1, wherein the control panel is visible through the handle in a central position thereof.

* * * * *